United States Patent [19]
Majer et al.

[11] Patent Number: 5,531,286
[45] Date of Patent: Jul. 2, 1996

[54] ASSISTED STEERING MECHANISM, IN PARTICULAR FOR MOTOR VEHICLES

[75] Inventors: Hans-Werner Majer; Jörgen Schöffel, both of Schwäbisch Gmünd; Rainer Schänzel, Essingen, all of Germany

[73] Assignee: ZF Friedrichshafen AG, Friedrichshafen, Germany

[21] Appl. No.: 335,813

[22] PCT Filed: May 12, 1993

[86] PCT No.: PCT/EP93/01170
§ 371 Date: Nov. 15, 1994
§ 102(e) Date: Nov. 15, 1994

[87] PCT Pub. No.: WO93/23277
PCT Pub. Date: Nov. 25, 1993

[30] Foreign Application Priority Data

May 15, 1992 [DE] Germany .......................... 42 16 053.7

[51] Int. Cl.[6] .............................. B62D 5/08; B62D 5/083
[52] U.S. Cl. ................................... 180/441; 91/449
[58] Field of Search ..................... 180/132, 141, 180/142, 149, DIG. 6, DIG. 7, DIG. 8; 91/449, 450, 451

[56] References Cited

U.S. PATENT DOCUMENTS

| | | | |
|---|---|---|---|
| 5,092,418 | 3/1992 | Suzuki et al. | 91/449 |
| 5,133,424 | 7/1992 | Fox et al. | 180/132 |
| 5,186,272 | 2/1993 | Smith | 180/132 |
| 5,419,235 | 5/1995 | Gilbert et al. | 180/132 |
| 5,447,209 | 9/1995 | Sasaki et al. | 180/132 |

*Primary Examiner*—Mitchell J. Hill
*Attorney, Agent, or Firm*—Larson & Taylor

[57] ABSTRACT

An auxiliary power steering unit, especially for motor vehicles, contains a control valve (1) made as a rotary slide valve for controlling a pressure medium conveyed by a servopump (3) out of a tank (4) to and from the pressure chambers of a servomotor (2). Control valve (1) reveals two feedback chambers (10, 11) that are connected via one, each, fixed throttle (12, 13) and a common throttle (14) to a pressure line (15) of the servopump (3). The feedback pressure that takes effect in the feedback chambers (10, 11) can be limited to a maximum value by a cutoff valve (18). The cutoff valve (18) is made as pressure balance whose response pressure can be adjusted from the outside without dismantling.

6 Claims, 1 Drawing Sheet

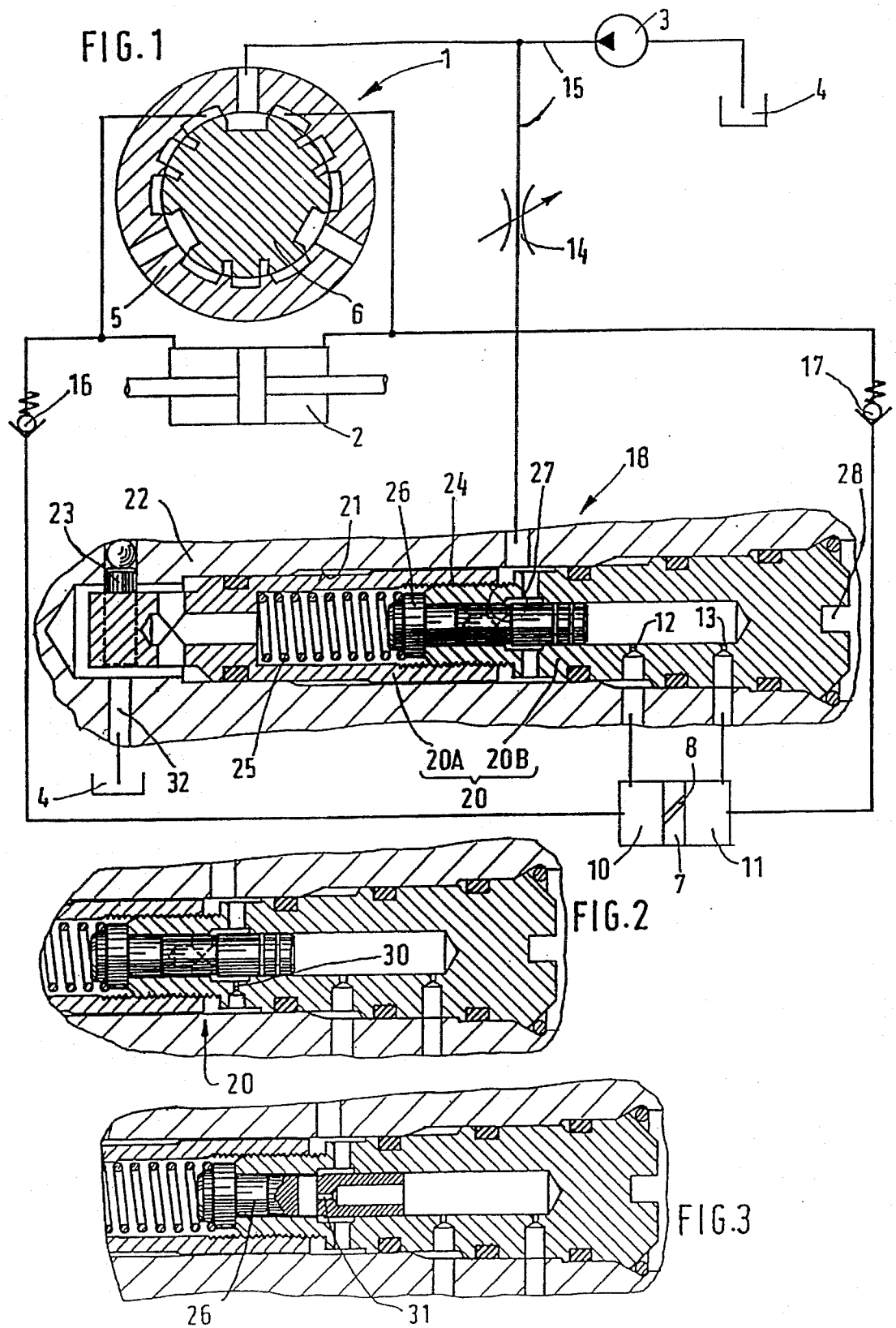

ASSISTED STEERING MECHANISM, IN PARTICULAR FOR MOTOR VEHICLES

BACKGROUND OF THE INVENTION

1. Field of the Invention

This invention relates to an auxiliary power steering unit, especially for motor vehicles. Such an auxiliary power steering has a control valve—made as a rotary slide valve—for controlling a pressure medium that is conveyed to and from the pressure chambers of a servomotor from a tank by a servopump. The rotary slide valve has two feedback chambers that are connected to the pressure line of the servopump via one, each, fixed throttle and via one common throttle. The feedback pressure that takes effect in the feedback chambers is limited to a maximum value by means of at least one cutoff valve.

2. Description of the Prior Art

Such an auxiliary power steering is known from EP-B1-0198824.

If the cutoff valve mentioned in this publication is made in the form of a seat valve, which is frequently the case, then the pressure medium stream regulated upon the valve's response is diverted directly into the tank. As a result, the pressure medium volume that is available for the servomotor of the auxiliary power steering is reduced considerably. Besides, flow and oscillation noises are generated during the diversion of the pressure medium screen. The switching pressure is also tolerance-tainted by unavoidable production tolerances.

The purpose of the invention is so to improve an auxiliary power steering known according to the state of the art that one can most extensively prevent a loss of pressure medium upon response of the cutoff valve and that the tolerances of the response pressures of the cutoff valve can, if at all possible, be avoided entirely.

SUMMARY OF THE INVENTION

This problem is solved by the auxiliary power steering of the present invention. The cutoff valve is made in the form of a pressure balance whose response pressure can be adjusted from the outside without dismantling. Besides, the cutoff valve is inserted in the pressure line of the servopump between the servopump and the feedback chambers. By using the pressure balance design and as a result of the arrangement in the pressure line, no connection is opened from the pressure line to the tank as the cutoff valve responds. Instead, the connection from the pressure line to the feedback chambers is increasingly blocked off so that the entire pressure medium stream, moved by the servopump, will continue to be available to the servomotor of the auxiliary power steering. Because the response pressure of the cutoff valve can be adjusted from the outside without dismantling, one can eliminate all of the production tolerances of the cutoff valve and one can compensate for additional tolerances in the other steering parts.

Practical and advantageous versions of the invention are given in the subclaims.

But the invention is not confined to the combinations of features given in the claims. The expert will find additional meaningful ways of combining claims and individual claim features from the problem statement.

The response pressure of the cutoff valve can be adjusted in a particularly simple fashion if the valve body of the cutoff valve consists of two parts whose inside-lying part is so made that it cannot be turned and whose axially movable and outside-lying part is made rotatably and axially immovable in the valve borehole. The inside-lying part is connected with the outside-lying part by means of a screw thread. If the outside-lying part is turned by an adjusting device that is accessible from the outside, then a pressure spring located inside the valve body is compressed more or less strongly. Because the pressure spring acts upon the control piston located inside the valve body, one can very accurately set the response pressure of the cutoff valve.

If the common throttle is so made that it reveals a throughflow cross section that can be altered as a function of the vehicle speed, then one can attain differing feedback forces as a function of the speed.

If the common throttle is made with a constant throughflow cross section, then this throttle can be arranged either in the valve body or in the control piston.

The invention will be explained in greater detail below with the help of three practical examples illustrated in the drawing.

BRIEF DESCRIPTION OF THE DRAWINGS

FIG. 1 is a diagram illustrating the auxiliary power steering with a longitudinal profile through the cutoff valve according to the invention;

FIGS. 2 and 3 show two variations of the cutoff valve with constant choke.

DESCRIPTION OF THE PREFERRED EMBODIMENTS

The auxiliary power steering contains a control valve 1 that is located in a steering gear which is not shown and that is made as a rotary slide valve. Pressure medium is supplied via control valve 1 to a servomotor 2 from a servopump 3 and, from there, it is fed back into a tank 4. Control valve 1 contains two valve elements 5 and 6 that are coaxially positioned within each other and that can be turned with relation to each other. In control valve 1, there is arranged a feedback piston 2 that—via a schematically indicated spiral gearing 8—is connected with one of the valve elements 5 and 6. Feedback piston 7 separates two feedback chambers 10 and 11 from each other. Feedback chambers 10 and 11 are connected via one, each, fixed throttles 12 or 13 and via a common throttle 14 to a pressure line 15 of servopump 3. Feedback chambers 10 and 11 are connected with the pertinent working chambers of the servomotor 2 via feedback valves 16 and 17 that can be controlled in direction toward the working chambers of servomotor 2.

Details of the rotary slide valve and the feedback chambers are not described because they are known, for example, from EP-B1-0198824.

A cutoff valve 18 is inserted in pressure line 15 between servopump 3 and feedback chambers 10 and 11, more specifically, between the common throttle 14 and the fixed throttles 12 and 13.

Cutoff valve 18 contains a valve body 20 that is held as a whole immovably in a valve borehole 21 of a valve housing 22. Looking in the axial direction, valve body 20 consists of an inside-lying part 20A and an outside-lying part 20B. One front surface of the outside-lying part 20B is freely accessible from the outside of valve housing 22 without having to dismantle any parts. Outside-lying part 20B is held rotatably and axially immovably in valve borehole 21. Inside-lying part 20A is guided in valve borehole 21 in an axially movable fashion. Inside-lying part 20A is secured against turning by a pin 23 that is retained in valve housing 22. Pin 23, for example, can rest against a flattened side or along the inside wall of a longitudinal perforation or slit of inside-lying part 20A. Inside-lying part 20A is connected with the outside-lying part 20B by a screw thread 24. In valve body 20, there is arranged a pressure spring 25 that is supported, on the one hand, upon the inside-lying part 20A and, on the other hand, on a control piston 26. Between control piston 26 and outside-lying part 20B, there is arranged a control edge pair 27 that is open when control piston 26 is in the neutral position and that can be controlled by a certain pressure that takes effect in feedback chambers 10 or 11. In that way, one can alter the pressure medium screen from the common throttle 14 to the fixed throttles 12 and 13.

During a steering movement, one of the feedback valves 16 or 17 is closed by the working pressure prevailing in one of the working chambers in servomotor 2. Pressure can build up in the pertinent feedback chamber 10 or 11. The other feedback chamber 11 or 10 is connected via the other feedback valve 17 or 16 and control valve 1 with the return to tank 4. In that way, there is a feedback pressure at work in one of the feedback chambers 10 or 11 and the magnitude of that feedback pressure depends on the level of the working pressure and on the cross section of the common throttle 14 and the fixed throttles 12 and 13.

The feedback pressure works on one side of control piston 26. The other side of control piston 26 is subjected to the force of pressure spring 25 and the pressure in tank 4, to which is connected the cutoff valve 18 via a leak line 32. The feedback pressure in feedback chambers 10 and 11 is thus limited to a maximum valve via cutoff valve 18 according to the pressure balance principle.

The force of pressure spring 25 upon control piston 26 and, thus, the maximum value of the feedback pressure prevailing in feedback chambers 10 and 11, can be set by turning the outside-lying part 20B of valve body 20.

The outside-lying part 20B can be turned easily by an adjustment device that is accessible from the outside and that, for example, has the shape of a slit 28.

In the practical example illustrated in FIG. 1, the common throttle 14 is equipped with a throughflow cross section that can be altered as a function of the vehicle speed. In that way, one can get a feedback force that is a function of the speed. If one is to do without any such speed-dependent alterability of the feedback force, then the common throttle is not made with a changeable throughflow cross section, but rather with a constant throughflow cross section. This is possible in that the common throttle 14 of FIG. 1 is replaced by a common throttle with constant throughflow cross section that, for example, is arranged as throttle 30 in valve body 20 (FIG. 2) or as throttle 31 in control piston 26.

REFERENCES

1 Control valve
2 Servomotor
3 Servopump
4 Tank
5 Valve element
6 Valve element
7 Feedback piston
8 Spiral gearing
9 —
10 Feedback chamber
11 Feedback chamber
12 Fixed choke point
13 Fixed choke point
14 Common choke point
15 Pressure line
16 Feedback valve
17 Feedback valve
18 Cutoff valve
19 —
20 Valve body
21 Valve borehole
22 Valve housing
23 Pin
24 Screw thread
25 Pressure spring
26 Control piston
27 Control edge pair
28 Slit
29 —
30 Choke point
31 Choke point
32 Leak line

We claim:

1. Auxiliary power steering, especially for motor vehicles, with a control valve which is a rotary slide valve for controlling a pressure medium conveyed via a pressure line by a servopump from a tank to and from working chambers of a servomotor, wherein the control valve includes two feedback chambers each of which is connected via a fixed throttle and via a common throttle to the pressure line of the servopump and where a feedback pressure, effective in the feedback chambers, can be limited to a maximum value by at least one cutoff valve, characterized in that the cutoff valve is made as a pressure balance with a pick-up pressure that can be set without dismantling the valve and the cutoff valve is inserted in the pressure line of the servopump between the servopump and the feedback chambers.

2. Auxiliary power steering according to claim 1 wherein the cutoff valve comprises a two-part valve body located in a valve borehole said valve body including an inner part which cannot be rotated but is movable axially and an outer part arranged coaxially with said inner part and which is rotatable and axially immovable in the valve borehole, wherein the inner part is connected with the outer part of the valve body by a screw thread, the outer part is rotatable by an adjustment device that is accessible from outside said cutoff valve, a control piston loaded by a pressure spring is arranged inside the valve body, and wherein the force of the pressure spring is adjustable by the rotation of the outer part.

3. Auxiliary power steering according to claim 1, wherein the common throttle reveals a throughflow cross section that can be altered as a function of the vehicle speed.

4. Auxiliary power steering according to claim 1, wherein the common throttle has a constant throughflow cross section.

5. Auxiliary power steering according to claim 2, above, characterized in that the common throttle (30) is arranged in valve body (20).

6. Auxiliary power steering according to claim 2, above, characterized in that the common throttle (31) is arranged in control piston (26).

* * * * *